(12) United States Patent
Murata

(10) Patent No.: US 6,526,049 B1
(45) Date of Patent: Feb. 25, 2003

(54) PACKET TRANSFERRING DEVICE

(75) Inventor: Makoto Murata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/768,922

(22) Filed: Dec. 18, 1996

(30) Foreign Application Priority Data

Jul. 10, 1996  (JP) .............................................. 8-180914

(51) Int. Cl.[7] .......................... H04L 12/28; H04L 12/54
(52) U.S. Cl. ...................................... 370/389; 714/746
(58) Field of Search ................................ 370/389, 394, 370/400, 428, 474, 473; 371/32, 33, 34; 714/746, 747, 748, 749, 750, 751

(56) References Cited

U.S. PATENT DOCUMENTS

| | | | |
|---|---|---|---|
| 5,245,616 A | * 9/1993 | Olson ........................... | 371/32 |
| 5,282,207 A | 1/1994 | Jurkevich et al. ........... | 370/468 |
| 5,282,238 A | * 1/1994 | Berland ........................ | 379/58 |
| 5,315,586 A | 5/1994 | Charvillat ................... | 370/232 |
| 5,392,402 A | 2/1995 | Robrock, II ................ | 395/200 |
| 5,521,971 A | 5/1996 | Key et al. .................... | 370/233 |
| 5,539,884 A | 7/1996 | Robrock, II ................ | 395/200 |
| 5,557,611 A | 9/1996 | Cappellari et al. .......... | 370/395 |
| 5,590,180 A | 12/1996 | Tonomura et al. .......... | 379/112 |
| 5,608,446 A | 3/1997 | Carr et al. ..................... | 348/6 |
| 5,623,492 A | 4/1997 | Teraslinna .................. | 370/468 |
| 5,633,868 A | 5/1997 | Baldwin et al. ............. | 370/331 |
| 5,664,091 A | * 9/1997 | Keen ............................ | 371/32 |
| 5,689,499 A | 11/1997 | Hullett et al. ................ | 370/235 |
| 5,696,764 A | 12/1997 | Soumiya et al. ............. | 370/395 |
| 5,734,656 A | 3/1998 | Prince et al. ................ | 370/401 |
| 5,745,685 A | * 4/1998 | Kirchner ................. | 395/200.14 |
| 5,751,719 A | * 5/1998 | Chen ........................... | 370/394 |
| 5,818,842 A | 10/1998 | Burwell et al. ............. | 370/412 |

FOREIGN PATENT DOCUMENTS

| | | |
|---|---|---|
| JP | 6481550 | 3/1989 |
| JP | 2-202151 | 8/1990 |
| JP | 548672 | 2/1993 |

OTHER PUBLICATIONS

Shinbun, A., "Personal Computer and Data Communication Protocols Handbook", Mar. 1985, pp. 144–145.
"AX.25 Amateur Packet–Radio Link–Layer Protocol, Version 2.0", Oct. 1984, 30 pages.

* cited by examiner

*Primary Examiner*—Ajit Patel
(74) *Attorney, Agent, or Firm*—Rothwell, Figg, Ernst & Manbeck

(57) ABSTRACT

When a data transferring operation ends in failure because a call was released in the midst of data transfer or the like, the data should be transferred again. In this data re-transfer, it is desirable to reduce the time spent for data transfer regardless of the functions provided by a terminal side. For this purpose, an order number is assigned to a packet containing data before it is sent. This number is stored in a storage section. Further, when a packet is confirmed as to its receipt by a transmission receiver, the order number of the packet is also stored. For a resending operation of the same data, a transmitted packet and an untransmitted packet can be discriminated from each other through comparison between order numbers of a sent packet and a transmitted packet. Based on the discrimination result, only untransmitted packets are subjected to a resending operation.

3 Claims, 4 Drawing Sheets

PACKET TRANSFERRING DEVICE

BACKGROUND OF THE INVENTION

1. Field of the Invention

The present invention relates to a packet transferring device which accommodates a data terminal and carries out packet communication via a network.

2. Description of the Prior Art

FIG. 5 is a sequence diagram showing an operation of a file transferring method, as disclosed in Japanese patent laid-open No. Hei 5-48672, or the like. In this diagram, a source computer transfers data to a destination computer via a network device.

A source computer sends a message SEQ100 which consists of a sequence number and data to a network device. Upon receipt of the message, the network device forwards a message SEQ101 to a destination computer. When the destination computer receives the message, it returns a message ACK102 to the network device. Having confirmed the receipt of the message ACK102, the network device returns a message ACK103 to the source computer. Receiving the message ACK103, the source computer sends an ACK confirmation signal 104 to the network device. The network device which receives the ACK confirmation signal 104 then sends a transmission instruction signal 105 to the source computer. When the source computer receives the signal 105, it is ready for starting the next data sending.

If the source computer does not receive a message ACK and instead receives a line disconnection signal 106 which informs that a line was disconnected due to line trouble from the network device, the source computer stops sending data to the network device until it receives a line recovery signal 107. upon receipt of a line recovery signal 107, the source computer identifies data whose receipt by a transmission receiver is not confirmed (in other words, data which has not obtained a transmission confirmation), based on the sequence numbers SEQ of data whose receipt by a transmission receiver is confirmed (transmitted data) by the messages ACK received thus far from the network device. The source computer then resumes sending data to the network device, beginning with the identified data without transmission confirmation. That is, the data without transmission confirmation is sent to the network because data whose receipt by a transmission receiver has been confirmed by a message ACK does not need to be resent.

As described above, when data is resent in a conventional transferring method as shown in FIG. 5, after restoration of a disconnected line due to line trouble, etc., a resending operation is conducted beginning with data which has not been sent or has not obtained a transmission confirmation (untransmitted data), and is not performed on data whose transmission confirmation has been obtained. In order to send data using this method, a source computer, i.e. a terminal, must always follow a special protocol in usual communication with a network device, i.e. a packet transferring device. In other words, this method is applicable only when a computer which supports a specific protocol is used as a source computer. Also, in this method, data sending may not be resumed when a protocol error occurs between a source computer and a network device due to communication trouble, etc.

SUMMARY OF THE INVENTION

The present invention was conceived to overcome the above problems, and thus aims to provide a packet transferring device which can execute an effective resending of data after a call is re-established to send the same data to the same receiver after a previous call was released, or disconnected. In other words, the packet transferring device of the present invention again receives a series of data from a terminal and detects transmitted data, so that a packet corresponding to the detected transmitted data is discarded without being resent. To summarize, in this packet transferring device, only packets whose receipt by a transmission receiver has not been confirmed, along with subsequent packets, are resent.

According to a first aspect of the present invention, there is provided a packet transferring device comprising:

packet preparation means for preparing a plurality of packets having a given length, based on a series of data sent from a terminal;

order number assignment means for assigning order numbers to the packets prepared by the packet preparation means;

transmission means for sending to a network those packets assigned order numbers;

transmitted packet order number storage means for storing an order number assigned to a packet whose receipt by a transmission receiver has been confirmed by a message sent from a transmission receiver via the network;

resending means for resending same data to a same receiver as for a previous call after re-establishment of a call when a line was disconnected after establishment of a previous call and before all data was transmitted, the packet transferring device further comprising
original packet preparation means for supplying all data resent from the terminal to the packet preparation means so as to again prepare packets from the data, and for supplying the packets prepared to the order number assignment means so as to again prepare packets assigned order numbers; and
transmission means for resending only the packets judged as untransmitted while discarding a packet judged as transmitted, judgment being made through comparison between order numbers assigned to the packets prepared by the original packet preparation means and an order number stored in the order number storage means.

In this arrangement, when the order number assigned to a packet is equal to or smaller than the order number stored in the device, which is the order number of a packet with transmission confirmation obtained, the packet is judged as transmitted, and is not resent. On the other hand, when the number is larger, as the packet is judged as untransmitted, it will be sent.

According to a second aspect of the present invention, there is provided a packet transferring device comprising:

order number assignment means for assigning order numbers to packeted data sent from a terminal;

transmission means for sending packets assigned order numbers to a network;

transmitted packet order number storage means for storing an order number assigned to a packet whose receipt by a transmission receiver has been confirmed by a message sent from a transmission receiver via the network;

resending means for resending same data to the same receiver as for a previous call after re-establishment of a call when a line was disconnected after establishment and before all data was transmitted, the data transferring device further comprising
original packet preparation means for supplying all packeted data resent from the terminal to the order number assignment means so as to prepare packets assigned order numbers again; and
transmission means for resending only those packets judged as untransmitted while discarding packets judged as transmitted, judgment being made through comparison between order numbers assigned to the packets prepared by the original packet preparation means and an order number stored in the order number storage means.

According to this aspect, when data is sent from the terminal in the form of a packet, the data transferring device assigns order numbers to the packets. As a result, the same advantage as that of the device according to the first aspect can be provided.

According to a third aspect of the present invention, there is provided a packet transferring device comprising:
storage means for storing a series of data sent from a terminal in a buffer;
packet preparation means for preparing a plurality of packets having a given length, based on the series of data stored in the buffer;
order number assignment means for assigning order numbers to the packets prepared by the packet preparation means;
transmission means for sending the packets assigned order numbers to a network;
transmitted packet order number storage means for storing an order number assigned to a packet whose receipt by a transmission receiver has been confirmed by a message sent from a transmission receiver via the network;
resending means for resending data to the same receiver as for a previous call after re-establishment of a call when a line was disconnected after establishment of the previous call and before all data was transmitted,
the packet transferring device further comprising
original packet preparation means for supplying the series of data stored in the buffer to the packet preparation means so as to again prepare packets from the data, and for supplying the packets prepared to the order number assignment means so as to again prepare packets assigned order numbers; and
transmission means for resending only those packets judged as untransmitted while discarding packets judged as transmitted, judgment being made through comparison between order numbers assigned to the packets prepared by the original packet preparation means and an order number stored in the order number storage means.

According to this aspect, a packet which has a larger order number than an order number stored in the device is considered as a packet whose receipt by a transmission receiver has not been confirmed and is therefore sent.

As described above, according to the first to third aspects of the present invention, the packet transferring device assigns an order number to a packet which was sent from a terminal to a network. Further, an order number of a packet is stored when the receipt of the packet by a transmission receiver on a network side is confirmed. Thus it is possible to know which packets have been confirmed as to their receipt by a transmission receiver within the packet transferring device. As a result, in an operation to send the same data to the same receiver, the packet transferring device makes a judgment so that packets without a transmission confirmation and subsequent packets are resent or sent and packets with a confirmation are not resent.

According to a fourth aspect of the present invention, there is provided a packet transferring device comprising:
number assignment means for assigning a given number to a packet to be sent and for storing the given number in a number storage means;
transmission means for sending the packet assigned a given number to a receiver, the given number being assigned by the number assignment means;
transmitted packet order number storage means for storing an order number assigned to a packet whose receipt by a transmission receiver has been confirmed by a message sent from a transmission receiver via the network; and
discrimination means for discriminating between transmitted and untransmitted packets through comparison between a content stored in the number storage means and a content stored in the transmitted packet number storage means.

According to this aspect, the discrimination means can easily identify a transmitted packet through comparison between the contents of the number storage means and of the transmitted packet number storage means.

According to a fifth aspect of the invention, a packet transferring device according to the fourth aspect comprises
resending means for sending an untransmitted packet after re-establishment of a call when a previous call to a transmission receiver was disconnected before all data was transmitted, wherein
the resending means includes resending packet determination means for determining a packet subjected to resending, based on a discrimination result made by the discrimination means.

In this aspect, when a call is disconnected due to trouble, the resending means determines which packets should be resent, based on the discrimination result by the discrimination means, which allows an effective resending operation.

According to a sixth aspect of the present invention, a packet transferring device according to the fourth aspect includes packet receiving means for receiving packets to be sent from a terminal.

According to a seventh aspect of the present invention, a packet transferring device according to the fifth aspect includes packet receiving means for receiving a packet to be sent from a terminal.

According to the sixth and seventh aspects, the packet receiving means receives packeted data, that is, a packet from a terminal.

According to an eighth aspect of the present invention, a packet transferring device according to the fourth aspect includes
data receiving means for receiving data to be sent from a terminal; and
packet preparation means for preparing a packet from the data received by the data receiving means.

According to a ninth aspect of the present invention, a packet transferring device according to the fifth aspect includes
data receiving means for receiving data to be sent, from a terminal; and
packet preparation means for preparing a packet from the data received by the data receiving means.

According to the eighth and ninth aspects, the packet preparation means receives data which has not been packeted yet from a terminal, and puts the data into a packet. This function allows the terminal to send any data intact to the packet transferring device without the need of putting them into a packet before sending.

According to a tenth aspect of the present invention, the number is an order number in a packet transferring device according to the fourth aspect.

According to an eleventh aspect of the present invention, the number is an order number in a packet transferring device according to the fifth aspect.

According to the tenth and eleventh aspects, the use of an order number makes it possible for a data transferring device to easily know which packets are transmitted and which packets are untransmitted.

BRIEF DESCRIPTION OF THE DRAWINGS

The above and the other objects, features, and advantages will be further apparent from the following description of the preferred embodiment taken in conjunction with the accompanying drawings wherein.

DESCRIPTION OF THE PREFERRED EMBODIMENTS

Preferred embodiments of the present invention will next be described with reference to the following drawings.
Embodiment 1

Figure 1:
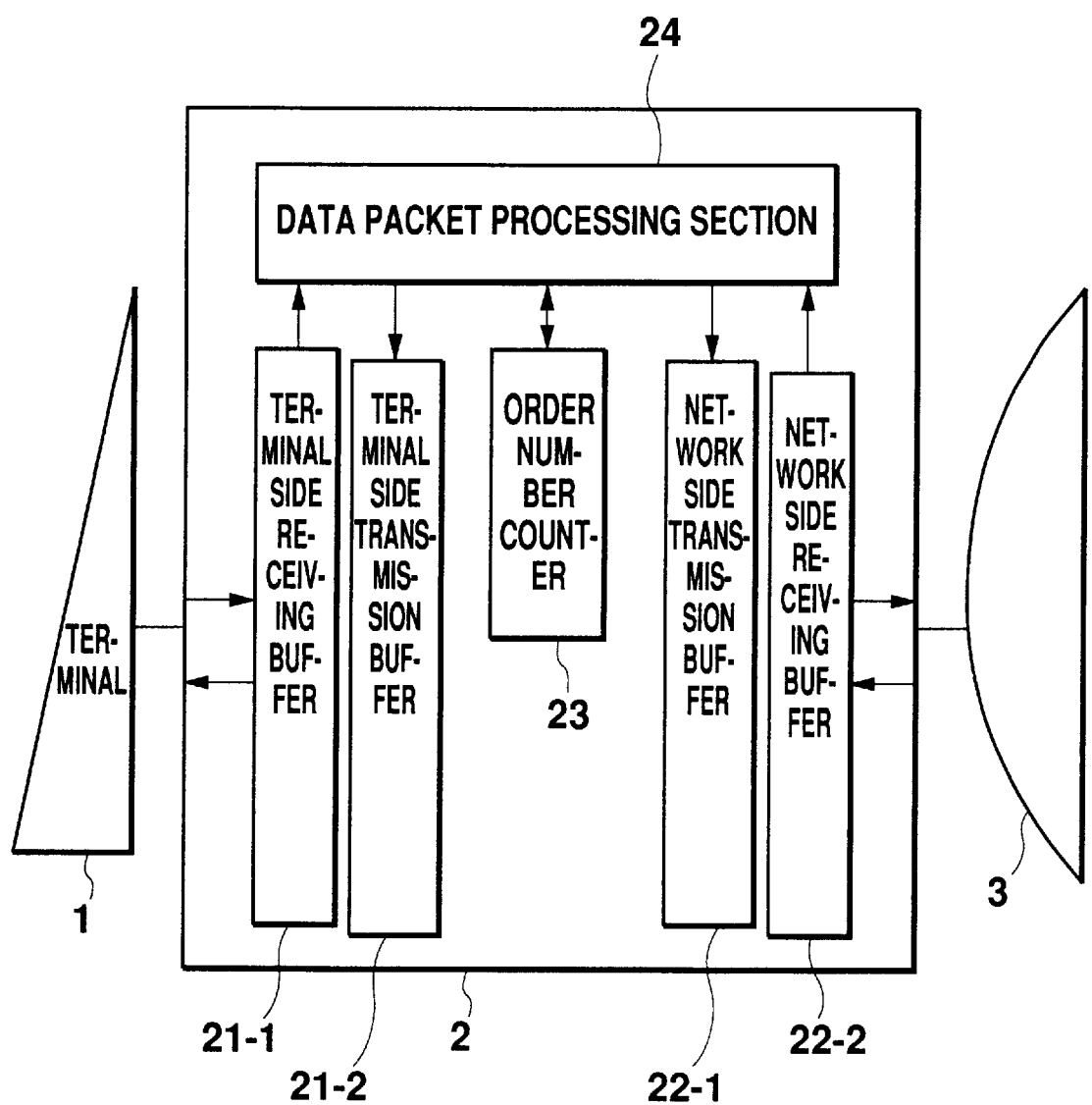
FIG. 1 is a block diagram showing the construction of a packet transferring device according to a preferred embodiment of the present invention.

FIG. 1 shows the construction of a packet transferring device according to a first embodiment of the present invention, in which the packet transferring device 2 accommodates a data terminal 1 and is connected to a network 3. The packet transferring device includes a terminal side receiving buffer 21-1 for temporarily holding data received from the terminal side and a terminal side transmission buffer 21-2 for temporarily holding data to be sent to the terminal side. The packet transferring device further includes a network side transmission buffer 22-1 for temporarily holding a packet to be sent to the network side and a network side receiving buffer 22-2 for temporarily holding a packet received from the network side.

The packet transferring device further includes an order number counter 23 and a data packet processing section 24. The order number counter 23 stores an order number of a transmitted packet. The data packet processing section 24 controls composing/decomposing and sending/receiving of a packet, connecting/releasing of a call, other packet transferring, execution of communication procedure, and various other sections of the present invention.

Figure 2:
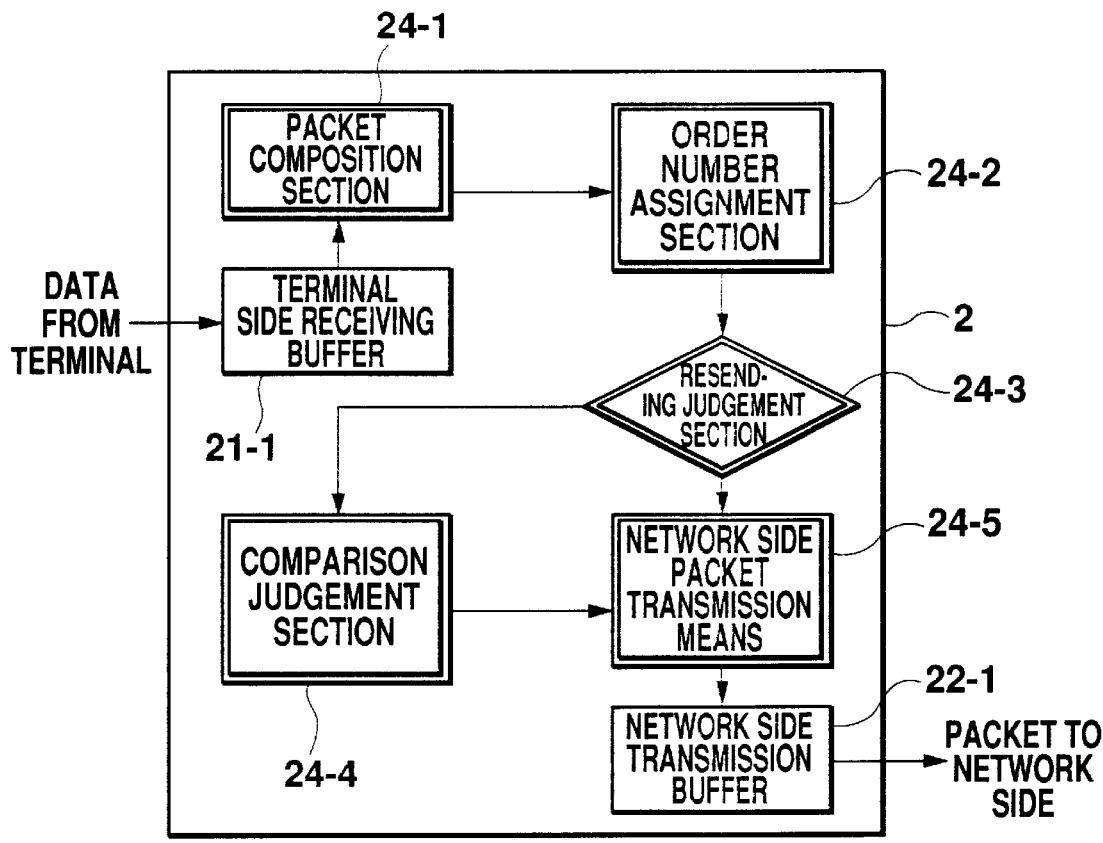
FIG. 2 is a block diagram showing functional sections used in sending data from a terminal of the packet transferring device according to this preferred embodiment.

FIG. 2 is a functional block diagram of the data packet processing section 24, which shows various functional sections used for an operation when data is received from the terminal 1. As shown in FIG. 2, a packet composition section 24-1 composes a packet having a given length from data received from the terminal 1. An order number assignment means 24-2 assigns an order number to every composed packet. A resending judgment section 24-3 judges whether the data on the verge of being sent is data to be resent or not. With a judgment is made that it is, a comparison judgment section 24-4 determines whether a packet comprising that data has been transmitted or not, referring to the number shown in the order number counter 23 and the order number of that packet. A transmission section 24-5 also sends a packet to the network side.

Figure 3:
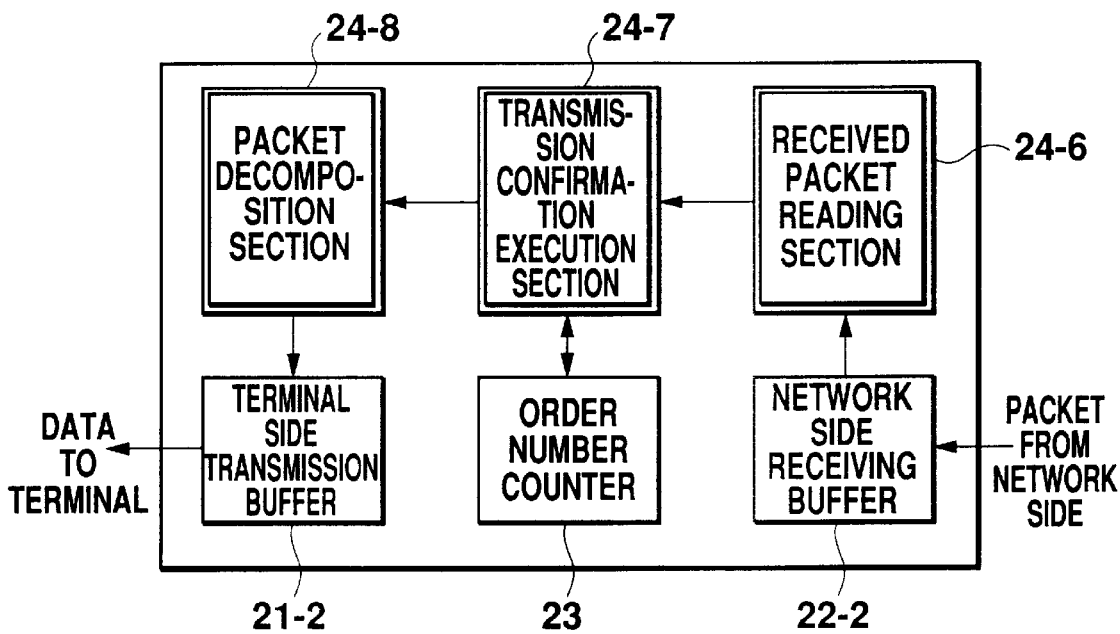
FIG. 3 is a block diagram showing functional sections used in sending data from a network of the packet transferring device according to this preferred embodiment.

FIG. 3 is a functional block diagram of the data packet processing section 24, which shows various functional sections used for an operation when data is received from the network 3. A received packet reading section 24-6 reads a packet received from the network. A transmission confirmation execution section 24-7 executes an operation for transmission confirmation of the packet read by the received packet reading section 24-6. The execution section 24-7 further detects the order number of a transmitted packet and sets the number in an order number counter 23. A packet decomposition means 24-8 decomposes a packet processed in the transmission confirmation section 24 into the form of data to be supplied to the terminal 1.

Figure 4:
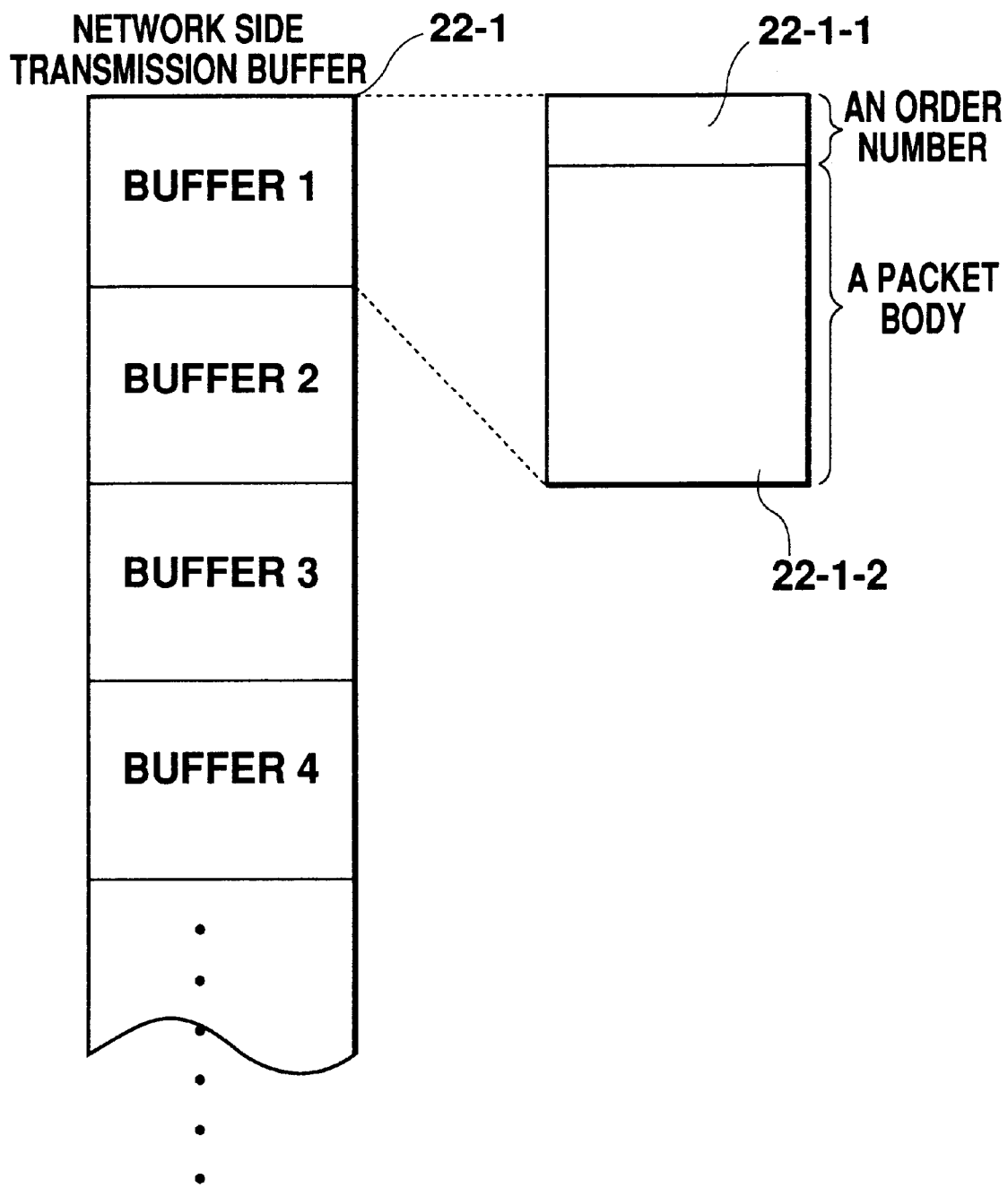
FIG. 4 shows a storage format of a network side transmission buffer according to this preferred embodiment.
Figure 5:
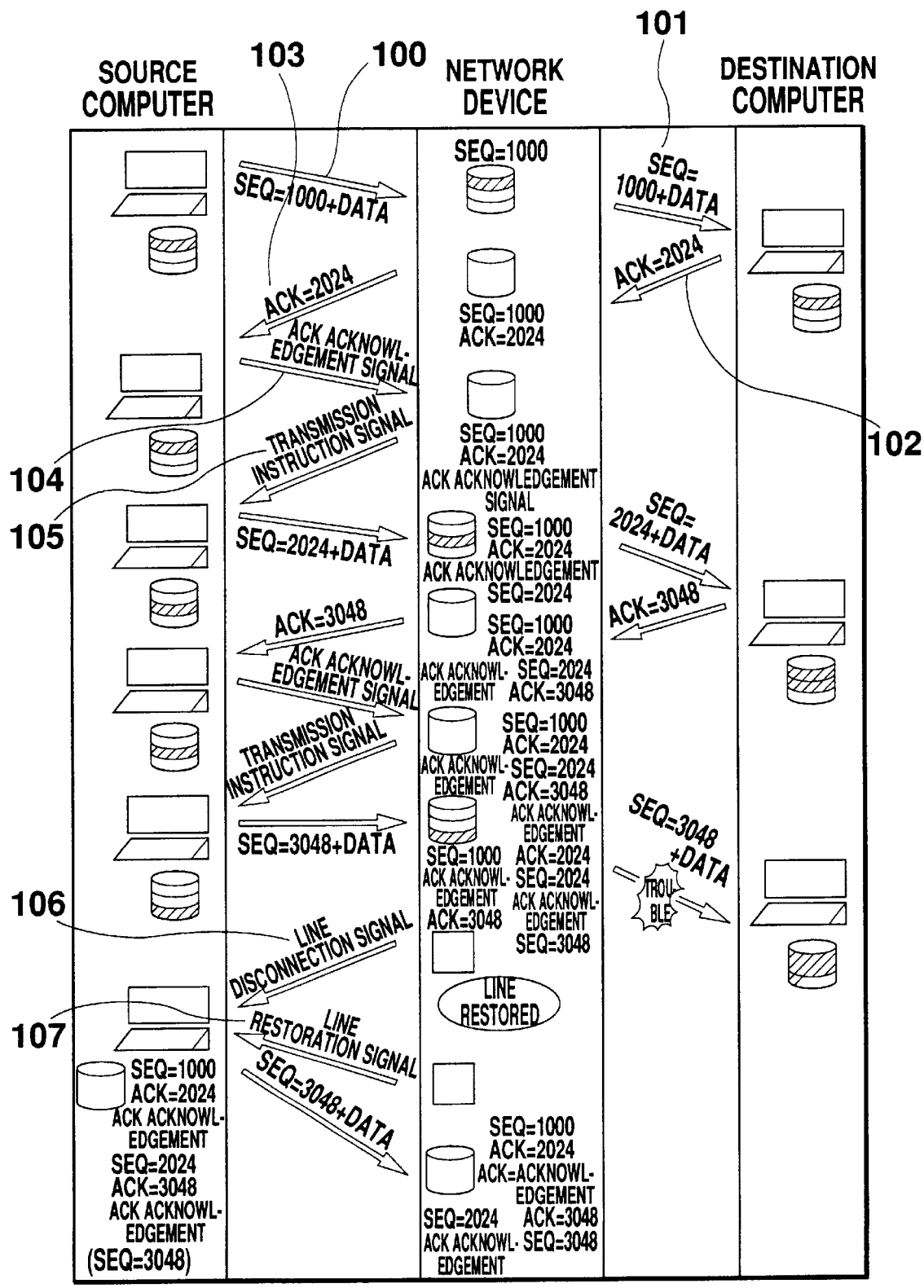
FIG. 5 shows an operational sequence for a conventional packet transferring method.

FIG. 4 shows a detailed representation of a storage format of a network side transmission buffer 22-1, which comprises an order number storage area 22-1-1 and a packet body storage area 22-1-2. The packet body storage area 22-1-2 stores the body of a packet to be sent to the network side, while the order number storage area 22-1-1 stores a packet order number.

In operation, data is transmitted via the terminal 1 and temporarily held in the terminal side receiving buffer 21-1. The packet composition section 24-1 reads the data from the buffer 21-1 and composes a packet having a given length from the data. The order number assignment section 24-2 then assigns to every thus composed packet an order number.

Subsequently, the resending judgment section 24-3 judges whether the current data on the verge of being sent will be resent or not. If not, in other words, when the current sending to be made is not a resending for the data, the network side packet transmission section 24-5 sends the data in the form of a packet with an assigned order number to the network side transmission buffer 22-1, so that the packet is held therein. For this packet storage, a storage format shown in FIG. 4 is used, so that a packet body in the packet body storage area 22-1-2 will be solely sent to the network side as a packet.

On the other hand, when the data is judged as being a resend, a comparison judgment section 24-4 compares the order number of the packet corresponding to the data and a number shown by the order number counter 23 which stores an order number of transmitted data. When the comparison result indicates that the assigned number is equal to or smaller than the number in the counter 23, it is known that this packet is a transmitted packet and the packet is discarded without being resent to the network side. On the other hand, when the comparison results show an assigned number larger than the number in the counter 23, it is known that the packet is untransmitted. The network side packet transmission section 24-5 then sends the packet assigned an order number to the network side transmission buffer 22-1, so that the packet is held therein. For this packet storage, a storage format shown in FIG. 4 is used, so that the stored packet will be sent to the network side.

In the following, an operation will be described when a packet transferring device 2 receives a packet from a network side. A received packet is temporarily held in the network side receiving buffer 22-2, and the received packet reading section 24-6 then reads the packet from the buffer 22-2. Because data transmission is conducted in accordance with a recommended standard protocol by ITU-T, X.25, etc., the transmission confirmation execution section 24-7 can detect from the read packet whether a packet sent corresponding to the read packet was duly received by a transmission receiver. Methods of obtaining a transmission confirmation vary depending on the communication protocol adopted.

Based on the order numbers of packets whose receipt by a transmission receiver have been confirmed as described above, order numbers of packets held in the network side transmission buffer 22-1 of FIG. 4 are identified. More specifically, a packet body 22-1-2 of a packet with a transmission confirmation obtained and an order number 22-1-1 assigned thereto are identified, referring to transmission confirmation. The identified order numbers are held in the order number counter 23, whereby the order number counter 23 is updated with each transmission confirmation. Meanwhile, a packet decomposition section 24-8 decomposes a packet received by a packet transferring device into the form of data to be sent to the terminal side transmission buffer 21-1 and further to the terminal 1.

Embodiment 2

In the foregoing first embodiment, a data transferring device 2 receives data from a terminal 1 and packets the data, assigning the packet an order number. According to the second embodiment, when data already in a packet form is sent from a terminal 1, the same advantage as that of the first embodiment can be achieved by assigning the packet an order number.

Embodiment 3

According to the third embodiment, all data sent from the terminal 1 is temporarily held in the terminal side receiving buffer 21-1 in the packet transferring device 2. The data held in the buffer 21-1 is then packeted and assigned order numbers before being sent via a network 3.

In this embodiment, there is no need to receive data again from the terminal 1 before resending the data because all data from the terminal 1 has been temporarily held in the terminal side receiving buffer 21-1. In other words, it is possible to compose a packet to be resent, using data held in the terminal side receiving buffer 21-1. The re-composed packet is judged whether to be resent or not, based on the criteria if a number assigned thereto is larger than a number shown in the order number counter. When it is so judged, that and subsequent packets will be sent or resent.

In the above description, a packet is transmitted from the terminal 1 and forwarded to the network 3 via the packet transferring device 2. However, the same process can be made to a packet which is transmitted from the network 3 to the terminal 1 via the packet transferring device 2.

As is apparent from the foregoing description, the first to third aspects of the present invention can provide the following advantage.

That is, when a situation where data should be resent occurs at any terminal, only the data required can be resent to a receiver when the terminal only resends data to a packet transferring device from the beginning. In this event, no special communication protocol is necessary for controlling a resending operation between the terminal and the packet transferring device. As a result, data transmission time is shortened, thereby reducing wasted use of communication lines.

According to the fourth aspect of the present invention, there can be provided a packet transferring device which can easily distinguish between transmitted and untransmitted packets.

According to the fifth aspect of the invention, there can be provided a packet transferring device which can easily determine which packets should be resent.

According to the sixth and seventh aspects of the invention, there can be provided a packet transferring device which can offer the same advantage as the device according to the fourth or fifth aspect of the invention in a packet transmission between a terminal and a receiver since the device can receive a packet from the terminal.

According to the eighth and ninth aspects of the invention, it is possible to execute the same packet control as in the devices according to the fourth and fifth aspects of the invention, even over a terminal which cannot compose a packet, since a packet is composed based on data sent from the terminal.

According to the tenth and eleventh aspects of the invention, there can provide a packet transferring device which can easily judge whether a package has been transmitted or not since order numbers are assigned to respective packets.

What is claimed is:

1. A packet transferring device comprising:

packet preparation means for preparing a plurality of packets having a given length, based on a series of data sent from a terminal;

order number assignment means for assigning order numbers to the packets prepared by the packet preparation means;

transmission means for sending to a network those packets assigned order numbers;

transmitted packet order number storage means for storing an order number assigned to a packet whose receipt by a transmission receiver has been confirmed by a message sent from a transmission receiver via the network;

resending means for resending same data to a same receiver as a receiver for a previous call after re-establishment of a call when a line was disconnected after establishment of the previous call and before all data was transmitted, the packet transferring device further comprising original packet preparation means for supplying all data resent from the terminal to the packet preparation means so as to again prepare packets from the data and for supplying the packets prepared to the order number assignment means so as to again prepare packets assigned order numbers; and transmission means for resending only the packets judged as untransmitted while discarding a packet judged as transmitted, judgment being made through comparison between order numbers assigned to the packets prepared by the original packet preparation means and an order number stored in the order number storage means.

2. A packet transferring device comprising:

order number assignment means for assigned order numbers to packeted data sent from a terminal;

transmission means for sending packets assigned order numbers to a network;

transmitted packet order number storage means for storing an order number assigned to a packet whose receipt by a transmission receiver has been confirmed by a message sent from a transmission receiver via the network;

resending means for resending same data to the same receiver as for a previous call after re-establishment of a call when a line was disconnected after establishment and before all data was transmitted, the data transferring device further comprising original packet preparation means for supplying all packeted data resent from the terminal to the order number assignment means so as to prepare packets assigned order numbers again; and transmission means for resending only those packets judged as untransmitted while discarding packets judged as transmitted, judgment being made through comparison between order numbers assigned to the packets prepared by the original packet preparation means and an order number stored in the order number storage means.

3. A packet transferring device comprising:

storage means for storing in a buffer a series of data sent from a terminal;

packet preparation means for preparing a plurality of packets having a given length, based on the series of data stored in the buffer;

order number assignment means for assigning order numbers to the packets prepared by the packet preparation means;

transmission means for sending the packets assigned order numbers to a network;

transmitted packet order number storage means for storing an order number assigned to a packet whose receipt by a transmission receiver has been confirmed by a message sent from a transmission receiver via the network;

resending means for resending data to the same receiver as for a previous call after re-establishment of a call when a line was disconnected after establishment of the previous call and before all data was transmitted, the packet transferring device further comprising original packet preparation means for supplying the series of data stored in the buffer to the packet preparation means so as to again prepare packets from the data, and for supplying the packets prepared to the order number assignment means so as to again prepare packets assigned order numbers; and transmission means for resending only those packets judged as untransmitted while discarding packets judged as transmitted through comparison between order numbers assigned to the packets prepared by the original packet preparation means and an order number stored in the order number storage means.

* * * * *